United States Patent
Fujita

(10) Patent No.: US 11,554,317 B2
(45) Date of Patent: Jan. 17, 2023

(54) COMPUTER-READABLE RECORDING MEDIUM THAT STORES GAME PROGRAM, METHOD OF CONTROLLING INFORMATION PROCESSING APPARATUS, AND INFORMATION PROCESSING APPARATUS FOR SLIDE PUZZLES

(71) Applicant: GREE, Inc., Tokyo (JP)

(72) Inventor: Hideki Fujita, Tokyo (JP)

(73) Assignee: GREE, Inc., Tokyo (JP)

( * ) Notice: Subject to any disclaimer, the term of this patent is extended or adjusted under 35 U.S.C. 154(b) by 56 days.

(21) Appl. No.: 17/009,364

(22) Filed: Sep. 1, 2020

(65) Prior Publication Data

US 2020/0398152 A1 Dec. 24, 2020

Related U.S. Application Data

(63) Continuation of application No. 16/110,154, filed on Aug. 23, 2018, now Pat. No. 10,792,563, which is a
(Continued)

(30) Foreign Application Priority Data

Apr. 21, 2014 (JP) .................................. 2014-087037
Sep. 26, 2014 (JP) .................................. 2014-195966

(51) Int. Cl.
*A63F 13/42* (2014.01)
*A63F 13/2145* (2014.01)
(Continued)

(52) U.S. Cl.
CPC .......... *A63F 13/2145* (2014.09); *A63F 13/42* (2014.09); *A63F 13/69* (2014.09); *A63F 13/822* (2014.09)

(58) Field of Classification Search
CPC ...... A63F 13/2145; A63F 13/42; A63F 13/69; A63F 13/822
See application file for complete search history.

(56) References Cited

U.S. PATENT DOCUMENTS

| 4,586,714 A | 5/1986 | Lenkoff et al. |
| 5,296,845 A | 3/1994 | Haller |

(Continued)

FOREIGN PATENT DOCUMENTS

| JP | 10-99543 | 4/1998 |
| JP | 2006-109915 | 4/2006 |

(Continued)

OTHER PUBLICATIONS

Office Action dated Dec. 22, 2020 in corresponding Japanese Patent Application No. 2019-014657 (with English Translation), 6 pages.
(Continued)

*Primary Examiner* — Omkar A Deodhar
*Assistant Examiner* — Shauna-Kay Hall
(74) *Attorney, Agent, or Firm* — Oblon, McClelland, Maier & Neustadt, L.L.P.

(57) ABSTRACT

A non-transitory computer-readable medium having instructions stored therein, which when executed by a computer cause the computer to provide a user with a first game. The instructions further cause the computer to display one or more pieces, each of the one or more pieces being movable in a predetermined direction according to a touch operation by the user. The instructions further cause the computer to retrieve, when a purpose of the first game is achieved, a game content as a reward given to the user, the game content being usable in a second game different from the first game to progress the second game.

23 Claims, 6 Drawing Sheets

Related U.S. Application Data continuation of application No. 14/690,724, filed on Apr. 20, 2015, now Pat. No. 10,086,270.

(51) Int. Cl.
*A63F 13/69* (2014.01)
*A63F 13/822* (2014.01)

(56) References Cited

U.S. PATENT DOCUMENTS

| | | | |
|---|---|---|---|
| 5,529,301 A | 6/1996 | Feller | |
| 5,643,084 A | 7/1997 | Mirsky | |
| 5,683,082 A | 11/1997 | Takemoto et al. | |
| 5,810,356 A | 9/1998 | Green | |
| 6,264,198 B1 | 7/2001 | Stamper | |
| 6,790,138 B1 | 9/2004 | Erlichman | |
| 8,758,119 B1 | 6/2014 | Bronstein Bendayan | |
| 8,900,043 B1 | 12/2014 | Elias et al. | |
| 2002/0183112 A1 | 12/2002 | Emmerson et al. | |
| 2007/0243919 A1 | 10/2007 | Thelen et al. | |
| 2007/0287517 A1 | 12/2007 | Asuna et al. | |
| 2008/0113327 A1 | 5/2008 | Larcheveque | |
| 2009/0258687 A1* | 10/2009 | Weichselbaum | A63F 13/12 463/9 |
| 2010/0144424 A1 | 6/2010 | Rogers et al. | |
| 2010/0234087 A1 | 9/2010 | Barnhart et al. | |
| 2011/0269518 A1* | 11/2011 | Carbonaro | G07F 17/3267 463/9 |
| 2012/0315993 A1* | 12/2012 | Dumont | G07F 17/3225 463/42 |
| 2012/0322556 A1 | 12/2012 | Rogers et al. | |
| 2013/0079077 A1 | 3/2013 | Stegall | |
| 2014/0106858 A1* | 4/2014 | Constable | G07F 17/323 463/25 |
| 2014/0370975 A1 | 12/2014 | Coronel et al. | |
| 2018/0082547 A1* | 3/2018 | Lathrop | G07F 17/32 |

FOREIGN PATENT DOCUMENTS

| | | |
|---|---|---|
| JP | 2007-7081 A | 1/2007 |
| JP | 2007-72569 A | 3/2007 |
| JP | 2008-236 | 1/2008 |
| JP | 2008-154793 | 7/2008 |
| JP | 2014-195966 | 10/2014 |
| JP | 5627059 | 11/2014 |

OTHER PUBLICATIONS

Notice of Reasons for Refusal dated Jul. 7, 2020 in corresponding Japanese Patent Application No. 2019-014657 (with English translation)(6 pages).
Office Action dated Jan. 14, 2020 in corresponding Japanese Patent Application No. 2019-014657 (with English Translation), 6 pages.
"Pokémon X, Pokémon Y," "Dengeki Nintendo Dec. 2013," KADOKAWA Co., Ltd., vol. 13, No. 14, Oct. 21, 2013, pp. 28,29, with English Translation and cover pages.
xsHIMEsxs, "Pattan puzzle; HARD; 16 seconds," https://www.youtube.com/watch?v=FsFz7SGy04o, Nov. 22, 2013, YouTube, LLC, YouTube, searched on Dec. 26, 2019, with English Translation and cover pages.
Office Action dated Dec. 24, 2019 in Japanese Patent Application No. 2016-125741 (with unedited computer generated English translation), 28 pages.
Decision of Dismissal of Amendment dated Jan. 7, 2020 in Japanese Patent Application No. 2016-125741 (with unedited computer generated English translation), 25 pages.
Office Action dated Oct. 30, 2018 in Japanese Patent Application No. 2016-125741, 6 pages (with unedited computer generated English translation).
Japanese Notice of Reasons for Rejection dated May 12, 2015 along with an English translation from corresponding Japanese Patent Application No. 2015-053553.
Japanese Notice of Reasons for Rejection dated May 20, 2014 along with an English translation from corresponding Japanese Patent Application Nos. 2014-087037.
"THEMES, Let's color your iPhone with so cute Kittv apps!, iPhone Magazine, Japan, San-ei Shobo Publishing Co., Ltd., Sep. 18, 2010, vol. 6, p. 58, see the section" 15 Puzzle of Kitty has appeared. Hello Kitty 15 Puzzle (Japanese-style version) along with a partial English translation.
"Pokehiro+, Annli Stvle," East Press Co., Ltd., Oct. 31, 2012, vol. 11, p. 187, see particularly the description on a linkage function along with a partial English translation.
"Sengoku Musou (Samurai Warriors) 3 Z Special, Weeklv Famitsu," Enterbrain, Inc., Feb. 2, 2012, vol. 27, No. 7, pp. 210-211, see particularly the description on elements linked to social games, on p. 211 along with a partial English translation.
"Tales of the World Radiant Mvthologv Mobile, Weeklv Famitsu," Enterbrain, Inc., Feb. 3, 2011, vol. 26, No. 8, p. 73, see particularly the description on linkage with Tales of the World Radiant Mythology 3 along with a partial English translation.
"Otometeki Koi Kakumei Love Revo!! Portable," Enterbrain Mook, B's LOG Annex Dolce 2011, Enterbrain, Inc., Feb. 23, 2011, first edition, p. 38 along with a partial English translation.
Chie, Free l Slide puzzle Lv99 by Dapan l Complete the puzzle of the cute Dapan and get a wallpaper/ [online], Atfreaks Limited, Oct. 15, 2013, iPhone Appinfo, [Searched on May 14, 2014], Internet<URL: http://iphone.appinfo.jp/blog/2013/10/15/%E7%84%A1%E6%96%99%EF%BD%9C%E3%82%B9%E3%83%A9%E3%82%A4%E3%83%89%E3%83%91%E3%82%BA%E3%83%ABlv99-by-%E3%81%A0%E3%83%BC%E3%81%B1%E3%82%93%EF%BD%9C%E3%81%8B%E3%82%8F%E3%81%84%E3%81%84%E3%81%A0%E3%83%BC/> along with a partial English translation.
"Takuo Kihira, Chapter 2, Part I, Making a puzzle game for smart phone, Nikkei BP Personal Comnuter Best Mook, introduction to Game Programming," Nikkei BP Inc., Dec. 5, 2012, p. 029-030 along with a partial English translation.
Notice of Reasons for Rejection dated Jan. 26, 2016 of corresponding Japanese Application No. 2015-211868, along with an English translation.
Yo-chan (id: yosuke-furukawa), Google DevQuiz Walkthroughs "Sliding Puzzles," Online, Hatena, Sep. 13, 2011, http://yosuke-furukawa.hatenablog.com/entry/20110913/1315932934, along with an English abstract.
Sorairo, "New Released DA-PAN! Difficulty Level upto 99!? Too Difficult <Sliding Puzzle Lv. 99 by DA-PAN>", Online, Safari Games, Septembers, 2013, 9-Bit, [searched on Jan. 18, 2016], http://9-bit.jp/archives/19141, along with an English abstract.
"Latest DA-PAN is Sliding Puzzle <Sliding Puzzle Lv. 99 bv DA-PAN>," Online, Aug. 26, 2013, Legend of Greatest Games, [searched on Jan. 18, 2016], http://game.eagle-inc.jp/2013/08/26/application-iphone/puzzle.slide-pazulle-lv-99-by-darpan, along with an English abstract.
Decision of Refusal dated May 10, 2016, of corresponding Japanese Application No. 2015-211868, along with an English translation.
Notification of Reasons for Refusal dated Mar. 13, 2018, from corresponding Japanese Application No. 2016-125741, along with an English translation.
Slide puzzle Lv99 presented by DAPAN, Aug. 26, 2013, Internet <URL: http://girl-app.com/review/%E3%82%B9%E3%83%A9%E3%82%A4%E3%83%89%E3%83%91%E3%82%BA%E3%83%ABlv99-by-%E3%81%A0%E3%83%BC%E3%81%BE [1%of]3%%[82]93/>, pp. 2-8, along with an English summary.
Final Fantasy Crystal Chronicles Crystal Bearer, Dec. 26, 2009, Internet URL:httn://www.4,,amer.netf,,ames/081/G00812I/20091226002/>, pp. 2-14, along with an English summary.
Strategic puzzle game with simple rules: Buttons and Scissors, Oct. 1, 2013, http://iphone.ascii.jp/2013/10/01/iphoneapp-game-buttonsandscissorsInternet >/<, pp. 2 and 3, along with an English summary.
Smile Precure! Puzzle, Oct. 9, 2013, Internet<https: [https://web.archive.org/web/20131009064108/]//app-liv.jp/543445727/>, pp. 2 and 3, along with an English summary.

(56) References Cited

OTHER PUBLICATIONS

"Raffaele Cecco, JavaScrint Granhics—Latest technique used in Game, Smart phone, and Web-," O'Reilly Japan, Inc., Mar. 17, 2012, first edition, first printing, pp. 220-221 along with a partial English translation.

"Takuo Kihira, Programming running from idea to completion, At will., 15 puzzle by JavaScriot, WEB+DB Press," Giiutsu-Hyohron Co., Ltd., May 25, 2010, vol. 56, first edition, first printing, pp. 63-71 along with an English translation.

* cited by examiner

COMPUTER-READABLE RECORDING MEDIUM THAT STORES GAME PROGRAM, METHOD OF CONTROLLING INFORMATION PROCESSING APPARATUS, AND INFORMATION PROCESSING APPARATUS FOR SLIDE PUZZLES

CROSS-REFERENCE TO RELATED APPLICATIONS

This application is a Continuation of U.S. patent application Ser. No. 16/110,154, filed on Aug. 23, 2018, which is a Continuation of U.S. Patent application Ser. No. 14/690,724, filed on Apr. 20, 2015, now U.S. Pat. No. 10,086,270, issued on Oct. 2, 2018, which claims priority from Japanese Patent Application Nos., 2014-087037, filed on Apr. 21, 2014 and 2014-195966, filed on Sep. 26, 2014. The benefit of priority is claimed to each of the foregoing. The entire contents of application Ser. No. 16/110,154 is incorporated herein by reference.

TECHNICAL FIELD

This disclosure relates to a computer-readable recording medium that stores a game program, and the like capable of providing a slide puzzle to a user.

BACKGROUND

Various types of slide puzzles in which plural puzzle pieces are arranged horizontally and vertically and the puzzle pieces freely move horizontally and vertically using a space obtained by removing one of the puzzle pieces to complete a predetermined pattern have been proposed. For example, Japanese Patent Application Laid-Open No. 2008-000236 discloses a slide puzzle in which codes indicating content information are read from a pattern that appears after completion of the puzzle using a mobile phone with a camera to enable provision of the content information.

Further, Japanese Patent Application Laid-Open No. 2008-154793 discloses a jigsaw puzzle input device of a touch panel screen capable of providing an enjoyable and a creative jigsaw puzzle with a simple operation and enhancing communication with other persons. Furthermore, Japanese Patent Application Laid-Open No. 2006-109915 discloses a service in which an image is divided into plural images to be distributed to plural mobile image display terminals and the images are exchanged between the terminals to create a composite image.

On the other hand, as electronic devices such as a smartphone or a tablet terminal have become widespread, games for the electronic devices in addition to games for home video game machines have been actively developed. A structure called a "GACHA (vending machine toy)" has become widespread as a structure that gives a character which is usable in a predetermined game to a user. When the user uses the "GACHA," the character is given to the user as a result of a random event that depends only on chance.

The "content information" disclosed in JP '236 is no more than a uniform resource locator (URL) of a web page that provides predetermined content to a user and, thus, the slide puzzle disclosed in JP '236 cannot provide a character which is usable in other services such as a game. Thus, in such a slide puzzle, it is difficult to maintain high motivation of the user to solve the puzzle. This is similarly applied to the related art techniques disclosed in JP '793 and JP '915.

On the other hand, since the "GACHA" is no more than a structure in which a character is given to a user as a result of a random event that depends only on chance, the user does not easily get a feeling of accomplishment of acquiring the character. Accordingly, the user does not easily have affection for the character and, consequently, does not easily feel enthusiasm for a game in which the character is usable.

It could therefore be helpful to provide a recording medium storing a game program and the like capable of providing a slide puzzle capable of maintaining high motivation of a user with excellent amusement.

SUMMARY

We thus provide:

A computer-readable recording medium that stores a game program configured to provide a user with a slide puzzle in which a plurality of partial images that form an image is arranged at predetermined positions for the purpose of recognizably reconstructing the image, the game program causes a computer to execute: displaying the slide puzzle so that each partial image is movable in a predetermined direction according to a touch operation detected by a predetermined input surface; and acquiring, when the purpose is achieved, a game content that is usable in a different game or change information to change information set in a predetermined game content in the different game, as a reward that is given to the user for progress of the different game and is associated with the image.

The "touch operation" refers to an operation of giving an input to the computer as the user brings a finger or an indicator (for example, a stylus or the like) into contact with or close to the input surface. Further, the "game content" refers to arbitrary electronic data (for example, a character, an item or the like) used by the user in the different game. In addition, the "information set in the predetermined game content" refers to a variety of information that regulates the game content in the different game and, for example, widely includes an attribute of the character or item, parameters (for example, attack power, defensive power, experience point, health point, speed, necessary ability point, special move, support skill, the number of usages or the like) of the character or item or the like.

Further, the game program may cause the computer to further execute: imposing a first restriction on time to achieve the purpose.

Further, the game program may cause the computer to further execute: imposing a second restriction on the number of moves necessary to achieve the purpose.

Further, the game program may cause the computer to further execute: presenting a hint relating to an operation to approach the achievement of the purpose to the user.

Further, the presenting may be executed to present a hint to the user by letters, or by changing a display mode of a partial image which is a target of the operation.

Further, the game program may cause the computer to further execute: adjusting a difficulty level of the slide puzzle by setting a wall that hinders the number of the partial images, the number of minimum moves necessary for the achievement of the purpose, or the movement of the partial image due to the touch operation.

Further, the game program may cause the computer to further execute: moving, when a predetermined operation is performed by the user, the partial images to approach the achievement of the purpose.

Further, the game program may cause the computer to further execute: selecting the game content acquired by the acquiring as a game content corresponding to the image according to a predetermined rule.

Further, the displaying may be executed to display the image together with the slide puzzle for reference to the achievement of the purpose.

Further, the image may represent the game content acquired by the acquiring.

Further, the image may include information capable of associating at least one of the game content, an attribute of the game content, a parameter set in the game content, and a change of the parameter.

Further, the game content may represent a character or an item in the different game, which is electronic data used by the user in the different game.

Further, the change information may be information that changes an attribute of a predetermined game content of the different game or a parameter of the predetermined game content.

A method of controlling an information processing apparatus configured to provide a user with a slide puzzle in which a plurality of partial images that form an image is arranged at predetermined positions for the purpose of recognizably reconstructing the image, the method includes: displaying the slide puzzle so that each partial image is movable in a predetermined direction according to a touch operation detected by a predetermined input surface; and acquiring, when the purpose is achieved, a game content that is usable in a different game or change information to change information set in a predetermined game content in the different game, as a reward given to the user for progress of the different game and is associated with the image.

Further, the method may further include: imposing a restriction on time to achieve the purpose.

Further, the method may further include: imposing a restriction on the number of moves necessary to achieve the purpose.

Further, the method may further include: presenting a hint relating to an operation for approaching the achievement of the purpose to the user.

An information processing apparatus configured to provide a user with a slide puzzle in which a plurality of partial images that form an image is arranged at predetermined positions for the purpose of recognizably reconstructing the image, includes: a display unit that displays the slide puzzle so that each partial image is movable in a predetermined direction according to a touch operation detected by a predetermined input surface; and a retrieving unit that acquires, when the purpose is achieved, a game content that is usable in a different game or change information to change information set in a predetermined game content in the different game, as a reward that is given to the user for progress of the different game and is associated with the image.

Further, the information processing apparatus may further include: a first restriction unit that imposes a restriction on time to achieve the purpose.

Further, may further include: a second restriction unit that imposes a restriction on the number of moves necessary to achieve the purpose.

According to the computer-readable recording medium, the method of controlling the information processing apparatus, and the information processing apparatus, when the slide puzzle is solved as the user moves each of the plural partial images that forms the image by the touch operation, it is possible to acquire the game content that is usable in the different game or the change information to change the information set in the predetermined game content in the different game, as the reward that is given to the user for progress of the different game and is associated with the image.

Thus, according to the computer-readable recording medium and the like, it is possible to give the user the pleasure of solving the slide puzzle and the feeling of accomplishment of acquiring the game content or changing the information set in the predetermined game content. That is, according to the computer-readable recording medium and the like, it is possible to provide a slide puzzle capable of maintaining high motivation of the user with excellent amusement.

Further, according to the computer-readable recording medium and the like, it is possible to allow the user to have affection for the acquired or changed game content, and to thus arouse enthusiasm of the user for the different game.

DESCRIPTION OF REFERENCE SIGNS

Figure 1:
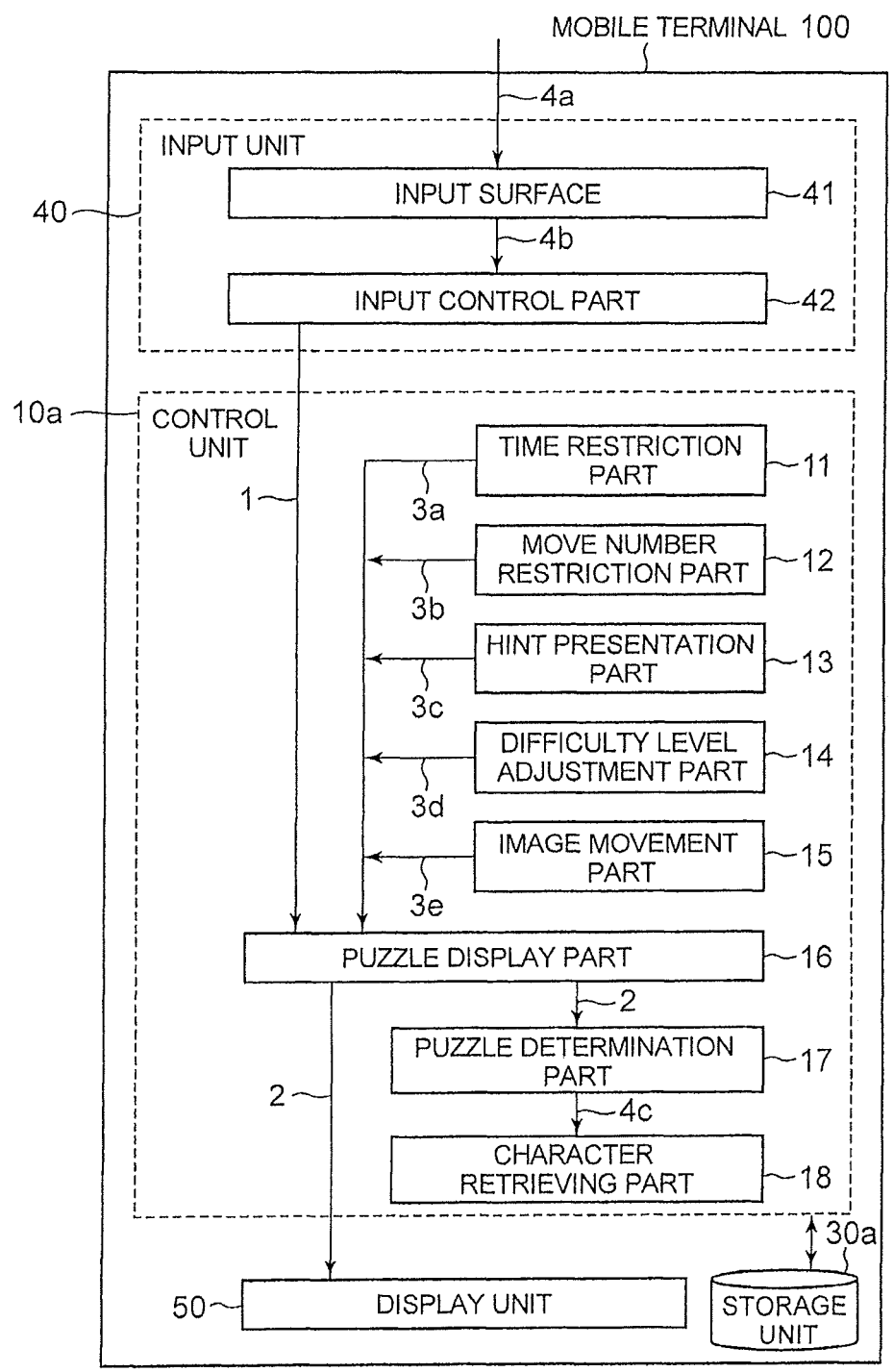
FIG. 1 is a block diagram illustrating a configuration of a main part of a mobile terminal according to Configuration 1.

1 locus
2 puzzle information
3*a* time information
3*b* move number information
3*c* hint information
3*d* difficulty level information
3*e* movement information
3*f* character information
3*g* output time information
4*a* touch operation
4*b* coordinate information
4*c* determination part
5 character image (image)
6 parts (partial image)
7*a* restricted number of moves
7*b* predetermined restricted time
7*c* hint
8 empty spaces
9 wall
10*a* control unit
10*b* control unit
11 time restriction part (first restriction function)

12 move number restriction part (second restriction function)
13 hint presentation part (presentation function)
14 difficulty level adjustment part (adjustment function)
15 image movement part (movement function)
16 puzzle display part (display function, display part)
17 puzzle determination part
18 character retrieving part (retrieving function, selection function, retrieving part)
19 input/output part
20 communication unit
21 reception part
22 transmission part
30a memory unit
30b memory unit
40 input unit
41 input surface
42 input control part
50 display unit
100 mobile terminal (information processing apparatus, computer)
101 server (information processing apparatus, computer)
P slide puzzle.

DETAILED DESCRIPTION

Configuration 1

Configuration 1 will be described with reference to FIGS. 1 to 4.

Outline of Mobile Terminal 100

A mobile terminal (information processing apparatus) 100 is an apparatus that includes an input surface 41 capable of detecting a touch operation 4a by a user and is able to provide the user with a slide puzzle P having the purpose of arranging plural parts (partial images) 6 that form a character image (image) 5 at predetermined positions to recognizably reconstruct the character image 5. The mobile terminal 100 may be an apparatus capable of executing processes which will be described later and, for example, may be realized using a smart-phone, a tablet terminal, a personal computer or the like.

Figure 2:
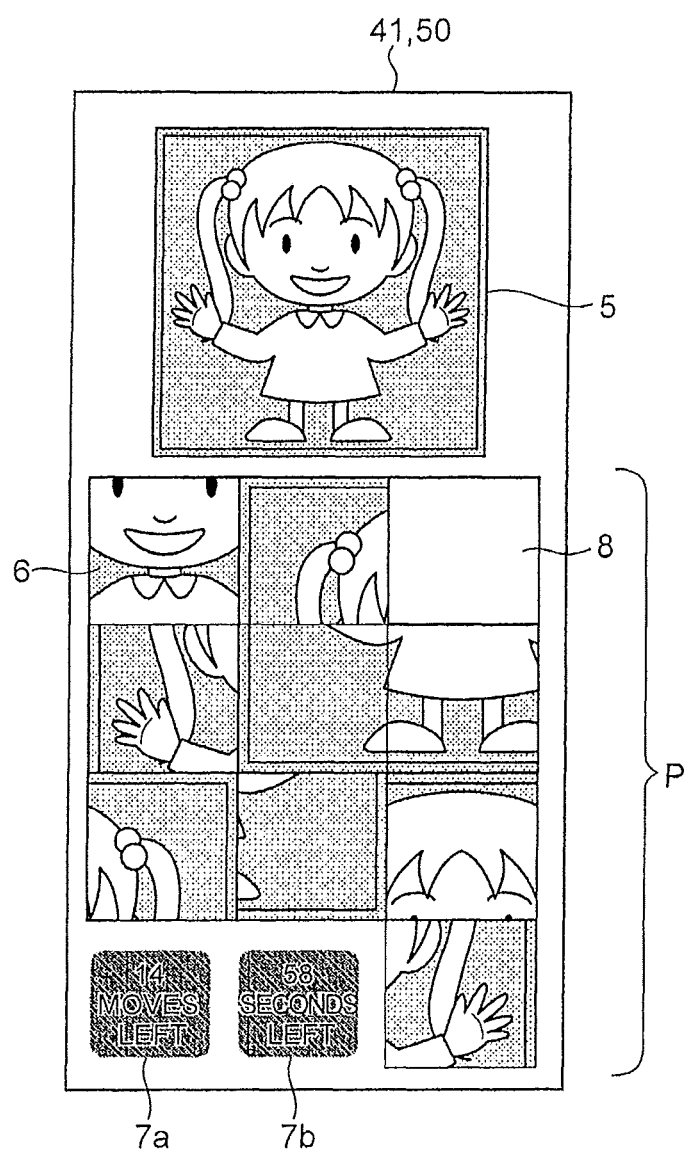
FIG. 2 is a schematic view illustrating a screen example of a puzzle game displayed in a display part provided in the mobile terminal.

FIG. 2 is a schematic view illustrating a screen example of a puzzle game displayed in a display unit 50 provided in the mobile terminal 100. The user may drag (refers to a touch operation of bringing a finger into contact with the input surface 41 and moving the finger to slide on the input surface 41) a part 6 adjacent to an empty space 8 to move the part 6 vertically or horizontally to fill the empty space 8. That is, due to the restriction that "the part 6 adjacent to the empty space 8 moves only in the direction toward the empty space 8," the respective parts 6 are arranged at appropriate positions to reconstruct the character image 5 so that the user enjoys solving the slide puzzle P.

When the user succeeds in solving the slide puzzle P (reconstructing the character image 5), the mobile terminal 100 acquires a character (game content) that appears as a pattern in the slide puzzle P, which is a character (or an item, a parameter change or the like) usable in another game (a predetermined game different from the slide puzzle P) (for example, from the server 101) (that is, gives the character to the user). According to the example shown in FIG. 2, the user may acquire a girl character, and may use the character in another game. That is, the character is not given to the user as a result of a random event that depends only on chance like the "GACHA" in the related art, but is given as a reward for an effort of solving the slide puzzle P.

The user may assemble a character card (game content) given as the above-mentioned character in a card deck in a different game such as a card battle game, to fight against an enemy character, or to select the above-mentioned character to progress a quest to enhance parameters (for example, attack power, defensive power, experience point, health point, speed, necessary ability point, special move, support skill or the like) set in the character.

Accordingly, the mobile terminal 100 can give the user the pleasure of solving the slide puzzle P and the feeling of accomplishment of acquiring the character. That is, the mobile terminal 100 can provide the slide puzzle P capable of maintaining high motivation of the user with excellent amusement. Further, the mobile terminal 100 can allow the user to have affection for the acquired character, and to thus arouse enthusiasm of the user for the different game.

Configuration of Mobile Terminal 100

FIG. 1 is a block diagram illustrating a configuration of a main part of the mobile terminal 100. As illustrated in FIG. 1, the mobile terminal 100 includes a control unit 10a (a time restriction part 11, a move number restriction part 12, a hint presentation part 13, a difficulty level adjustment part 14, an image movement part 15, a puzzle display part 16, a puzzle determination part 17, and a character retrieving part 18), an input unit 40 (an input surface 41 and an input control part 42), a display unit 50, and a memory unit 30a.

The control unit 10a generally controls various functions of the mobile terminal 100. The control unit 10a includes the time restriction part 11, the move number restriction part 12, the hint presentation part 13, the difficulty level adjustment part 14, the image movement part 15, the puzzle display part 16, the puzzle determination part 17, and the character retrieving part 18.

The time restriction part 11 restricts time to achieve the purpose of solving the slide puzzle P (reconstructing the character image 5). Specifically, the time restriction part 11 may output time information 3a including information relating to the time to the puzzle display part 16, to thereby present a predetermined restricted time (for example, 5 minutes) to the user, as indicated by reference numeral 7b in FIG. 2. The time restriction part 11 may present the restricted time to the user, for example, by counting down the restricted time according to the time elapsed after the user starts solving the slide puzzle P, and may terminate the game when the restricted time becomes zero.

Thus, the mobile terminal 100 may give the user a feeling of tension with respect to the solution of the slide puzzle P. Further, the mobile terminal 100 may provide a slide puzzle P with excellent variation due to imposition of the restricted time such as a slide puzzle in which "the difficulty level of the slide puzzle is low, but the user should solve the puzzle in a short amount of time," or a slide puzzle in which "the user may slowly solve the puzzle in a long period of time, but the difficulty level of the slide puzzle is high."

The move number restriction part 12 imposes a restriction on the number of moves necessary to achieve the purpose. Specifically, the move number restriction part 12 may output move number information 3b including information relating to the number of moves to the puzzle display part 16, to thereby present the restricted number of moves to the user as illustrated by reference numeral 7a in FIG. 2. The move number restriction part 12 may present the restricted number of moves to the user, reduces the restricted number of moves whenever the user moves the part 6, and terminate the game when the restricted number of moves becomes zero.

Thus, the mobile terminal 100 may give the user a feeling of tension with respect to the solution of the slide puzzle P.

The mobile terminal 100 may terminate the slide puzzle P (declare the game over) when the restricted number of moves is smaller than the number of minimum moves necessary to solve the slide puzzle P. Thus, the mobile terminal 100 may give the user the stronger feeling of tension with respect to the solution of the slide puzzle P.

The hint presentation part 13 presents a hint relating to an operation of approaching the achievement of the purpose by (1) letters or (2) by changing a display mode of the part 6 which is a target of the operation to the user. The hint presentation part 13 outputs the hint information 3c including information relating to the hint to the puzzle display part 16.

Figure 3A:
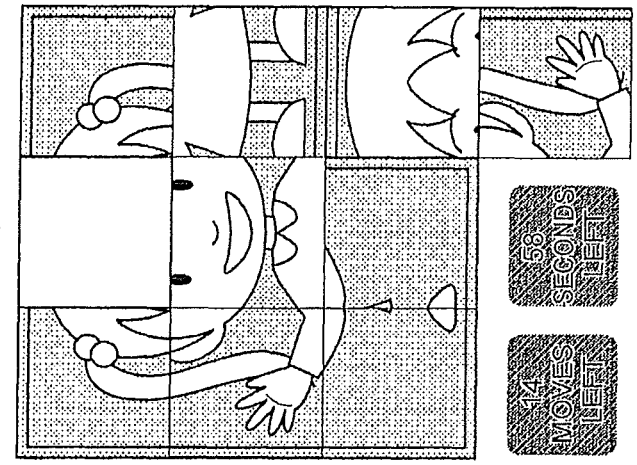
FIG. 3A is a schematic view illustrating an example of a game screen to present a hint relating to an operation of approaching achievement of the purpose of "solve a slide puzzle" to a user.

FIG. 3A is a schematic view illustrating an example of a game screen to present the hint to the user. As illustrated in FIG. 3A, the hint presentation part 13 may present the number of minimum moves necessary for the user to solve the slide puzzle P as the hint (see reference numeral 7c) to the user. Alternatively, when the user performs an operation of moving the part 6 in the wrong direction, the hint presentation part 13 may present a warning indicating that the operation is wrong to the user as the hint. Alternatively, the hint presentation part 13 may blink the part 6 which is a target of the next move for display to present the hint to the user.

The hint presentation part 13 may present the hint to the user when a predetermined hint presentation condition is satisfied. For example, the hint presentation part 13 may present the hint to the user (1) when the user performs an operation of using a predetermined item, (2) when the number of moves necessary to achieve the purpose is smaller than a predetermined number of moves, (3) when the level of the user does not reach a predetermined level, and/or (4) when the time until the purpose is achieved is shorter than a predetermined time, for example. By presenting the hint to the user as described above, the mobile terminal 100 can lower a threshold in which the user works on the slide puzzle P, to thereby maintain high motivation of the user.

The difficulty level adjustment part 14 adjusts the difficulty level of the slide puzzle P by setting (1) the number of parts 6 (the number of divisions of the character image 5), (2) the number of minimum moves necessary for the achievement of the purpose (the degree that the parts 6 are shuffled), or (3) the wall 9 that hinders the movement of the parts 6. The difficulty level adjustment part 14 outputs difficulty level information 3d including information relating to the difficulty level (the number of divisions, the number of moves, the position of the wall 9, or the like) to the puzzle display part 16.

For example, the difficulty level adjustment part 14 may adjust the difficulty level of the slide puzzle P by setting the number of divisions of the character image 5 to 9 (3.times.3), 12 (3.times.4) or 16 (4.times.4). Alternatively, the difficulty level adjustment part 14 may adjust the difficulty level of the slide puzzle P by setting the number of moves so that the purpose cannot be achieved unless the parts 6 move at least 25 times (without 25 moves), or by setting the number of moves so that 10 moves are enough.

Figure 3B:
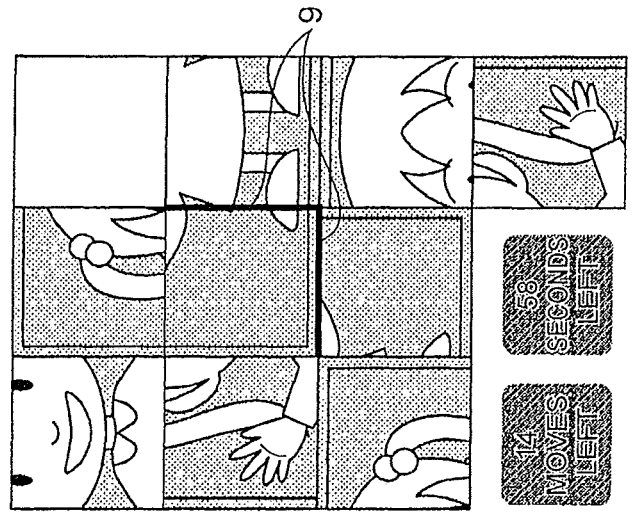
FIG. 3B is a schematic view illustrating an example of a game screen when a wall that hinders movement of a part is set.

FIG. 3B is a schematic view illustrating an example of a game screen when the wall 9 that hinders the movement of the parts 6 is set. As illustrated in FIG. 3B, when the wall 9 is set by the difficulty level adjustment part 14, if the wall 9 is present in the direction toward the empty space 8, the user cannot move the parts 6 in the direction. That is, the difficulty level adjustment part 14 may apply a restriction to a movable direction of the parts 6, to thereby increase the difficulty level of the slide puzzle P.

Since the mobile terminal 100 may freely adjust the difficulty level as described above, for example, it is possible to set the difficulty level depending on an attribute of a character acquired when the purpose is achieved (strength, rarity or the like of the character in a different game), the number of slide puzzles P that are previously solved by the user, the level of the user or the like. For example, the mobile terminal 100 may set the difficulty level of the slide puzzle P to be high as the strength or rarity of the acquired character becomes high. Thus, the mobile terminal 100 can provide the slide puzzle P capable of maintaining high motivation of the user with excellent amusement.

When a predetermined operation is performed by the user, the image movement part 15 moves the part 6 to approach the achievement of the purpose. The "predetermined operation" may be an operation using an item (an operation of selecting a desired item, an operation of consuming the item, or the like), for example.

Figure 3C:
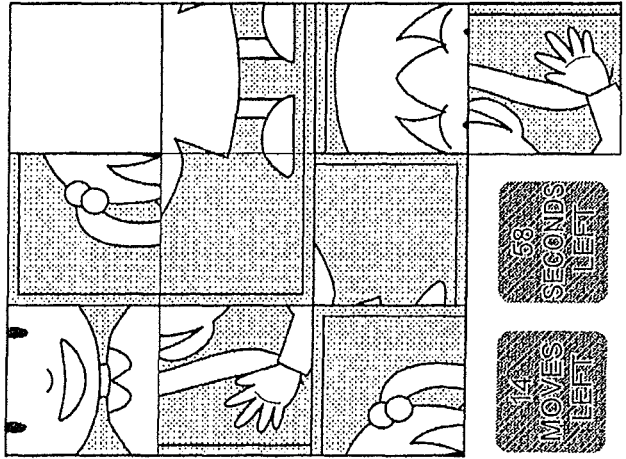
FIG. 3C is a schematic view illustrating an example of a game screen when a user approaches the achievement of the purpose by a predetermined number of moves by performing an operation of using an item.

FIG. 3C is a schematic view illustrating an example of a game screen when the user approaches achievement of the purpose by a predetermined number of moves by performing the operation of using the item. As illustrated in FIG. 3C, the image movement part 15 may move the parts 6 by a predetermined number of moves (for example, 5 moves). The image movement part 15 outputs movement information 3e including information relating to the movement of the parts 6 to the puzzle display part 16.

When the user uses the item, the mobile terminal 100 may generate predetermined effects that advantageously act on the user such as (1) reduction of the number of the parts 6 (for example, changing 4.times.4 slide puzzles to 3.times.4 slide puzzles) to lower the difficulty level, (2) non-occurrence of reduction of the restricted number of moves even when the parts 6 move, or (3) stopping of the count-down of the restricted time, for example. Thus, the mobile terminal 100 may lower the threshold in which the user works on the slide puzzle P to maintain high motivation of the user.

The puzzle display part (display part) 16 displays the slide puzzle P so that the parts 6 can move in a predetermined direction (a direction where the empty space 8 is filled) according to the touch operation 4a detected by the input surface 41. The puzzle display part 16 may display the slide puzzle P and the character image 5 (completed image) for reference to the achievement of the purpose (see FIG. 2). The puzzle display part 16 outputs puzzle information 2 including information on the slide puzzle P to be displayed in the display unit 50 to the display unit 50 and the puzzle determination part 17.

The puzzle determination part 17 determines whether the purpose of recognizably reconstructing the character image 5 (solving the slide puzzle P) is achieved, and outputs the determination result (determination result 4c) to the character retrieving part 18.

When it is determined that the purpose is achieved by the puzzle determination part 17, the character retrieving part (retrieving part) 18 acquires a character or an item usable in a different game, or change information to change information set in a predetermined character or an item in the different game, as a reward that is given to the user for progress of the different game and is associated with the character image 5. As described above, according to the example shown in FIG. 2, the user may acquire the girl character. Further, the character image 5 may represent an item which is usable in a different game and, in this case, the character retrieving part 18 may acquire the item.

The change information may be information to change the attribute (information set in a predetermined game content)

of the predetermined character or item in the different game, or parameters (information set in the predetermined game content, for example, attack power, defensive power, experience point, health point, speed, necessary ability point, special move, support skill, the number of usages or the like) of the character or item. For example, when the change information is acquired by the character retrieving part 18, the user may increase the attack power of the character to be used in the different game.

Further, a character, an item, or change information that appears as a pattern as the user solves the slide puzzle P, and the character, the item, or the change information acquired by the character retrieving part 18 may be associated with each other as the reward for progress of the different game. That is, both of them may be the same, or may be different from each other.

In the latter case, it is preferable that the character (character image 5) that appears as the pattern in the slide puzzle P include information capable of associating at least one of the character acquired by the character retrieving part 18, the attribute of the character, the parameters set in the character (attack power, defensive power or the like in the different game), and the parameter change.

For example, when the user succeeds in solving the slide puzzle P, when "ribbon" that appears as a pattern is shown by a completed image, the user associates a character or an item relating to "girl," and works on the slide puzzle P while expecting to acquire the character or item. Alternatively, when the user succeeds in solving the slide puzzle P, when "dumbbell" that appears as a pattern is shown by the completed image, the user works on the slide puzzle P while expecting to change (increase) parameters relating to the strength (for example, attack power, hit point or the like) of a predetermined character or item in a different game.

Further, the character retrieving part 18 selects the character or item according to a predetermined rule. For example, the character retrieving part 18 may randomly select one character from plural "girl" characters to acquire the corresponding character. Alternatively, the character retrieving part 18 may select a "girl" character designated by "ribbon" in advance to acquire the corresponding character.

In this way, when the character (image) that appears as the pattern as the user succeeds in solving the slide puzzle P, when the character, the item, or the parameter change (change information) acquired by the character retrieving part 18 are different from each other, the mobile terminal 100 may cause the user to expect what character, item or parameter change that can be acquired after the user succeeds in solving the slide puzzle P is. That is, since the mobile terminal 100 may adopt the unpredictability of a "GACHA," it is possible to provide a slide puzzle with higher amusement.

The input unit 40 receives the touch operation 4a from the user. In this example, the input unit 40 may be a touch panel capable of detecting multi-touch. The input unit 40 includes the input surface 41 and the input control part 42.

The input surface 41 is a device capable of detecting a position designated by the touch operation 4a of the user (for example, a touch surface included in the touch panel). The input surface 41 outputs coordinate information 4b corresponding to the designated position to the input control part 42.

The input control part 42 acquires the coordinate information 4b from the input surface 41 at predetermined time intervals, and outputs a series of pieces of coordinate information 4b to the puzzle display part 16 as a locus 1.

The display unit 50 is a device that displays a game screen. In this example, the display unit 50 may be a liquid crystal display. In FIG. 1, to clarify respective functions of the input unit 40 and the display unit 50, both are separately shown. However, for example, when the input unit 40 is a touch panel and the display unit 50 is a liquid crystal display, it is preferable that both the input unit 40 and the display unit 50 are integrally formed.

The memory unit 30a is a storage device configured by an arbitrary storage medium such as a hard disk, a silicon state drive (SSD), a semiconductor memory, or a DVD, for example, and stores a game program and data capable of controlling the mobile terminal 100.

Process Executed by Mobile Terminal 100

Figure 4:
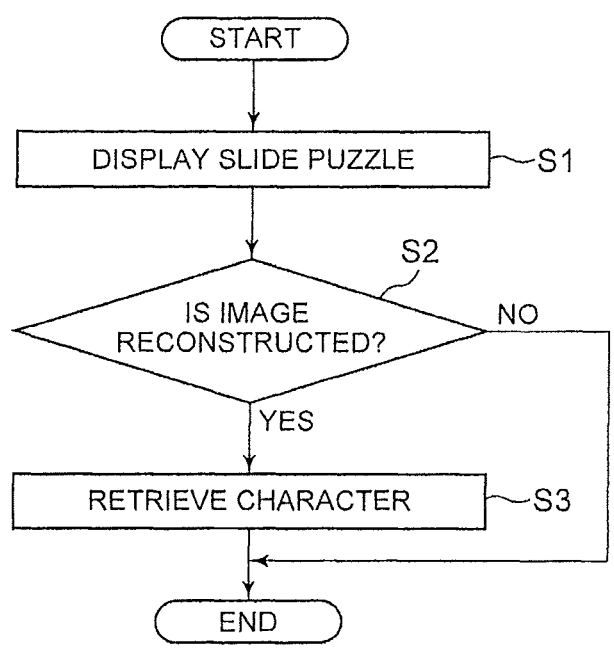
FIG. 4 is a flowchart illustrating an example of a process executed by the mobile terminal.

FIG. 4 is a flowchart illustrating an example of a process executed by the mobile terminal 100. In the following description, "steps" represent respective steps included in the method of controlling the information processing apparatus.

The puzzle display part 16 displays the slide puzzle P so that the parts 6 can move in a predetermined direction (direction where the empty space 8 is filled) according to the touch operation 4a (step 1, hereinafter, "step" is simply referred to as "S," display step). When it is determined by the puzzle determination part 17 that the slide puzzle P is solved (YES in S2), the character retrieving part 18 acquires a character or an item that is usable in a different game or change information to change information set in a predetermined character or item in the different game as a reward that is given to a user for progress of the different game and is associated with the character image 5 (S3, retrieving step).

The control method may arbitrarily include a process executed in a different block (for example, the time restriction part 11, the move number restriction part 12, the hint presentation part 13, the difficulty level adjustment part 14, or the image movement part 15), in addition to the process described with reference to FIG. 4.

Effects of the Mobile Terminal 100

The mobile terminal 100 can give a user the amusement of solving the slide puzzle P and the feeling of accomplishment of acquiring a character or an item or changing information set in a predetermined character or item. That is, the mobile terminal 100 can provide a slide puzzle capable of maintaining high motivation of the user with excellent amusement. Further, the mobile terminal 100 can allow the user to have affection for the acquired character or item, and to thus arouse enthusiasm of the user for the different game.

Configuration 2

Configuration 2 will be described with reference to FIGS. 5 and 6. In Configuration 2, only a configuration added to the above-described Configuration 1 or a configuration different from the configuration of Configuration 1 will be described. That is, the configuration disclosed in Configuration 1 may be entirely included in Configuration 2 (or vice versa). Further, the definition of the terms disclosed in Configuration 1 is similarly applied to Configuration 2.

Differences Between Configuration 1 and Configuration 2

In Configuration 1, a configuration (stand alone configuration) in which the game program capable of providing the slide puzzle P is executed in the mobile terminal 100 is described. On the other hand, in Configuration 2, a configuration (cloud configuration) in which the game program is executed by the server 101 and the execution process result is returned to the mobile terminal 100 will be described.

Configuration of the Server 101

Figure 5:
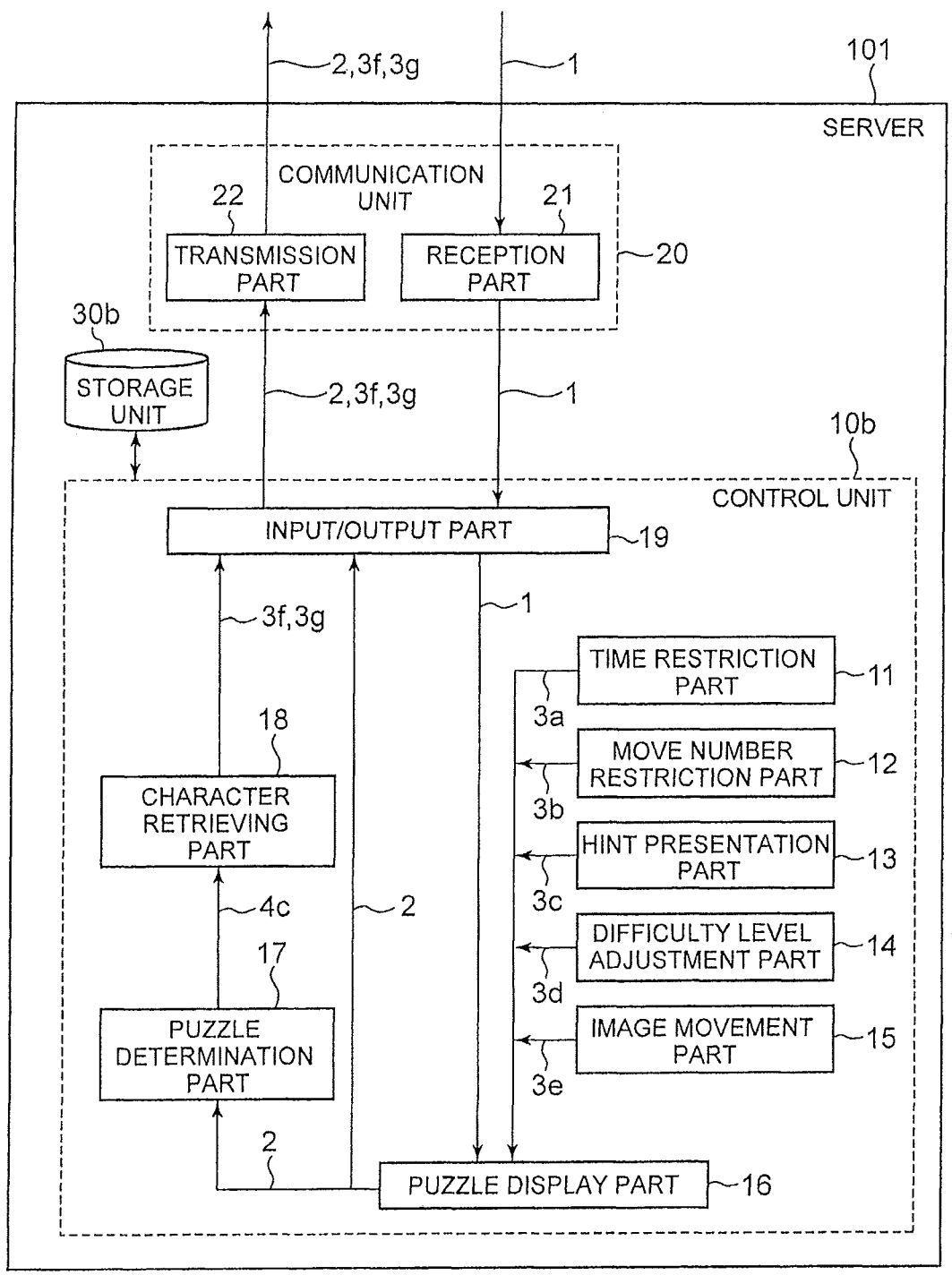
FIG. 5 is a block diagram illustrating a configuration of a main part of a server according to Configuration 2.

FIG. 5 is a block diagram illustrating a configuration of a main part of the server 101. The server (information processing apparatus) 101 is an apparatus capable of providing the user with the slide puzzle P having the purpose of recognizably reconstructing the character image 5, by acquiring a locus 1 (touch operation 4a which is an input from the user with respect to the mobile terminal 100) from the mobile terminal 100, generating information (puzzle information 2) to arrange the plural parts 6 that form the character image 5 at predetermined positions, and transmitting the puzzle information 2 to the mobile terminal 100.

As shown in FIG. 5, the server 101 includes a control unit 10b (a time restriction part 11, a move number restriction part 12, a hint presentation part 13, a difficulty level adjustment part 14, an image movement part 15, a puzzle display part 16, a puzzle determination part 17, a character retrieving part 18, and an input/output part 19), a communication unit 20 (a reception part 21 and a transmission part 22), and a memory unit 30b.

The control unit 10b generally controls various functions of the server 101. The control unit 10b further includes the input/output part 19, in addition to the configurations (the time restriction part 11, the move number restriction part 12, the hint presentation part 13, the difficulty level adjustment part 14, the image movement part 15, the puzzle display part 16, the puzzle determination part 17, and the character retrieving part 18) included in the above-described control unit 10a.

The input/output part 19 acquires the locus 1 received by the reception part 21, and outputs the locus 1 to the puzzle display part 16. Further, when the puzzle information 2 is input from the puzzle display part 16, the input/output part 19 outputs the puzzle information 2 through the transmission part 22 to transmit the puzzle information 2 to the mobile terminal 100. Further, when character information 3f including information relating to a character acquired by the character retrieving part 18 and/or change information 3g to change information set in a predetermined character or item in a different game is input from the character retrieving part 18, the input/output part 19 transmits the character information 3f and/or the change information 3g to the mobile terminal 100.

The communication unit 20 communicates with an external device through a communication network according to a predetermined communication method. It is sufficient if a fundamental function of realizing the communication with the external device (for example, the mobile terminal 100) is provided and, thus, a communication line, a communication method, a communication medium or the like is not particularly limited. The communication unit 20 may be configured by an Ethernet (Registered Trademark) adaptor or the like. Further, the communication unit 20 may use a communication method or a communication medium such as IEEE802.11 wireless communication or Bluetooth (registered trademark). The communication unit 20 includes the reception part 21 and the transmission part 22.

The reception part 21 receives the locus 1 (that is, the touch operation 4a given as the input with respect to the mobile terminal 100) from the mobile terminal 100.

The transmission part 22 transmits the puzzle information 2 input through the input/output part 19, the character information 3f, and/or the change information 3g to the mobile terminal 100.

The memory unit 30b is a storage device configured by an arbitrary storage medium such as a hard disk, an SSD, a semiconductor memory or a DVD, similar to the above-described memory unit 30a, and stores a game program and data capable of controlling the server 101.

Further, the number of slide puzzles P solved by a user up to now, an item owned by the user, the level of the user, and a character owned by the user in a different game or the like may be stored in association with user identification information (for example, a user ID) in the memory unit 30b according to a predetermined data format (for example, a table format or the like). For example, information about a name, rarity, attribute, level, attack power, defensive power, health point, speed, necessary ability point, special move, support skill, or the number of usages of a character may be stored for each character.

Process Executed by the Server 101

Figure 6:
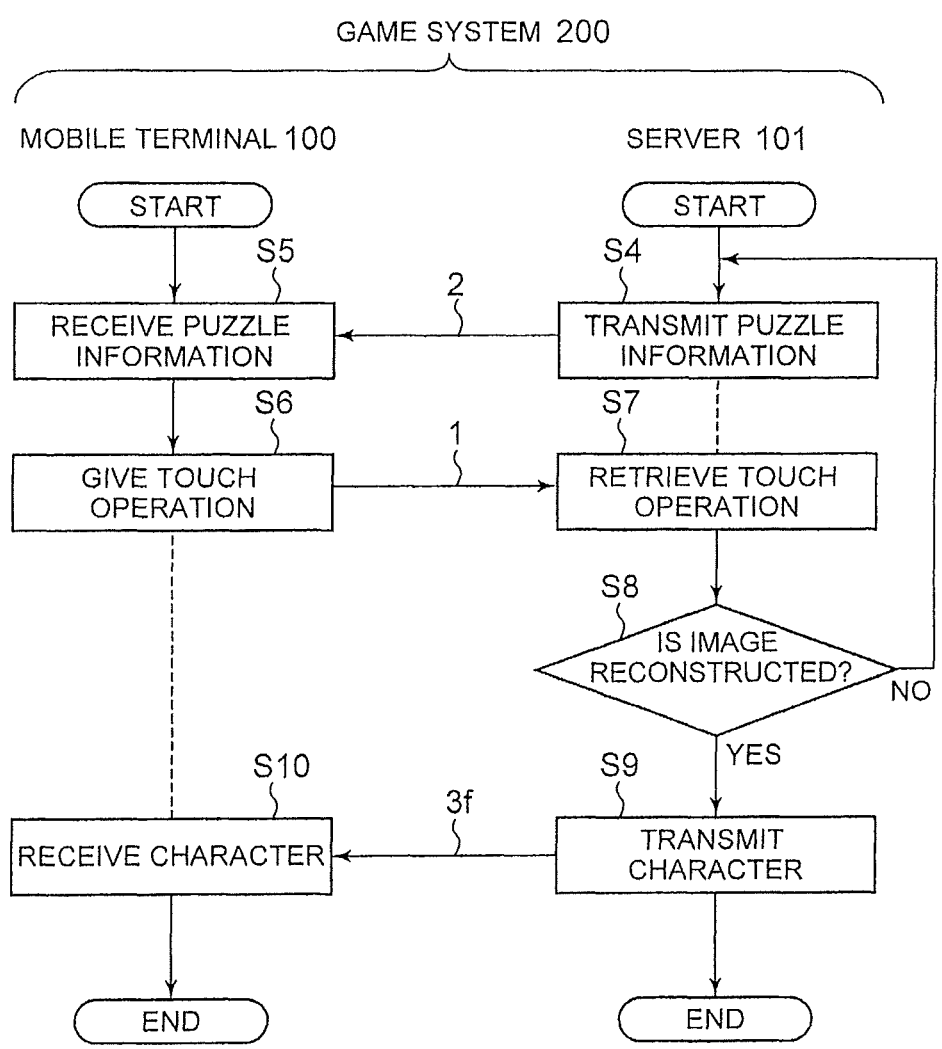
FIG. 6 is a flowchart illustrating an example of a process executed in a game system that includes the mobile terminal and the server.

FIG. 6 is a flowchart illustrating an example of a process executed in a game system 200 that includes the mobile terminal 100 and the server 101. In the following description, "steps," which is noted in brackets, represent respective steps included in the method of controlling the information processing apparatus.

The puzzle display part 16 transmits the puzzle information 2 to the mobile terminal 100 to display the slide puzzle P so that the parts 6 can move in a predetermined direction (direction where the empty space 8 is filled) according to the touch operation 4a (S4, display step). The mobile terminal 100 receives the puzzle information 2 from the server 101, and displays the slide puzzle P in a display unit 50 based on the puzzle information 2 (S5).

The mobile terminal 100 transmits the locus 1 given as the input by the touch operation 4a to the server 101 (S6), and the server 101 receives the locus 1 so that the server 101 can acquire the touch operation 4a (S7). When it is determined by the puzzle determination part 17 that the slide puzzle P is solved (YES in S8), the character retrieving part 18 acquires a character that is usable in a different game or change information to change information set in a predetermined character or item in the different game as a reward that is associated with the character image 5 (S9, retrieving step). Further, the mobile terminal 100 transmits information (character information 3f) relating to the character and/or the change information 3g to the mobile terminal 100 (S9). The mobile terminal 100 receives the character information 3f and/or the change information 3g (S10).

The control method may arbitrarily include a process executed in a different block (for example, the time restriction part 11, the move number restriction part 12, the hint presentation part 13, the difficulty level adjustment part 14, or the image movement part 15), in addition to the process described with reference to FIG. 6. In this case, the time information 3a, the move number information 3b, the hint information 3c, the difficulty level information 3d, and/or the movement information 3e are properly transmitted from the server 101 to the mobile terminal 100.

Effects of the Server 101

The server 101 can give a user the pleasure of solving the slide puzzle P and the feeling of accomplishment of acquiring a character or an item or changing information set in a predetermined character or item. That is, the server 101 can provide a slide puzzle capable of maintaining high motivation of the user with excellent amusement. Further, the server 101 can allow the user to have affection for the acquired character or item, and to thus arouse enthusiasm of the user for the different game.

Other Configuration Examples

In Configuration 1, the configuration (stand alone configuration) in which the mobile terminal 100 executes the processes necessary for providing the slide puzzle P to the user is described, and in Configuration 2, the configuration (cloud configuration) in which the server 101 executes the processes is described. However, a configuration that realizes the present disclosure is not limited to the above-described two examples, and the processes may be appropriately shared by the mobile terminal 100 and the server 101.

For example, the server 101 may execute a process of determining whether the slide puzzle P is solved (puzzle determination part 17) and a process of acquiring a character or an item and/or change information of parameters or the like (character retrieving part 18), and the mobile terminal 100 may execute a process of displaying the slide puzzle P (puzzle display part 16). Which one of the mobile terminal 100 or the server 101 executes a specific process included in the processes may be arbitrarily determined according to calculation capacities of the mobile terminal 100 and the server 101, the speed of the communication line that connects the mobile terminal 100 to the server 101, the number of users or the like and, thus, the slide puzzle P may be provided to the user through the entire game system 200.

Realization Examples Based on Software

The control blocks (particularly, the control unit 10a and the control unit 10b) of the mobile terminal 100 and the server 101 may be realized by a logical circuit (hardware) formed as an integrated circuit (IC chip) or the like, or may be realized by software using a central processing unit (CPU). In the latter case, the mobile terminal 100 and the server 101 include a CPU that executes a command of a game program which is software for realizing each function, a read only memory (ROM) or a storage device (referred to as a "recording medium") in which the game program and a variety of data is readably recorded by a computer (or CPU), a random access memory (RAM) that develops the game program and the like. Further, the computer (or CPU) reads the game program from the recording medium, and executes the game program. As the recording medium, a "non-temporary tangible medium," for example, a tape, a disk, a card, a semiconductor memory, a programmable logical circuit or the like may be used. Further, the game program may be supplied to the computer through an arbitrary transmission medium (a communication network, broadcast waves or the like) capable of transmitting the game program. My media, apparatus and methods may also be realized in the format of a data signal embedded in a carrier in which the game program is realized by electronic transmission.

Specifically, the game program may be a game program capable of providing the slide puzzle (P) having the purpose of recognizably reconstructing the image by arranging the plural partial images (parts 6) that form the image (character image 5) at predetermined positions, and allows the computer (the mobile terminal 100 and the server 101) to execute a display function, a retrieving function, a first restriction function, a second restriction function, a presentation function, an adjustment function, a movement function, and a selection function.

The display function, the retrieving function, the first restriction function, the second restriction function, the presentation function, the adjustment function, the movement function, and the selection function may be realized by the above-described puzzle display part 16, the character retrieving part 18, the time restriction part 11, the move number restriction part 12, the hint presentation part 13, the difficulty level adjustment part 14, the image movement part 15, and the character retrieving part 18, respectively. Details thereof are as described above.

The game program may be installed using a script language such as ActionScript or JavaScript (Registered Trademark), an object-oriented programming language such as Objective-C or Java (Registered Trademark), a markup language such as HTML5 or the like. Further, a game system that includes a mobile terminal including the respective parts that realize the respective functions realized by the game program and a server including respective parts that realizes remaining functions different from the respective functions is also included in the scope of this disclosure.

Supplementary Information

This disclosure is not limited to the above-described examples and configurations, and may be altered by those skilled in the art within the scope of the appended claims. An example obtained by appropriately combining technical means disclosed in different examples is included in the technical scope of this disclosure. Further, new technical features can be formed by combining technical means disclosed in the examples.

This disclosure can be widely applied to an arbitrary computer such as a smart-phone, a mobile phone, a tablet terminal, a personal computer, a server, a work station, or a main frame.

The invention claimed is:

1. A non-transitory computer-readable medium having instructions stored therein, which when executed by a computer cause the computer to:
provide a user with a first game;
display one or more pieces, each of the one or more pieces being movable in vertical and horizontal directions, each of the one or more pieces being moved in a direction corresponding to a touch operation to the piece by the user; and
retrieve, when a purpose of the first game is achieved, a game content as a reward given to the user, the game content being usable in a second game different from the first game to progress the second game.

2. The non-transitory computer-readable medium according to claim 1, wherein the retrieved game content changes information that is set to a predetermined game content in the second game.

3. The non-transitory computer-readable medium according to claim 1, wherein the retrieved game content is usable only in the second game.

4. The non-transitory computer-readable medium according to claim 1, wherein the first game is a puzzle game.

5. The non-transitory computer-readable medium according to claim 1, wherein the retrieved game content increases a speed of a predetermined game content in the second game.

6. The non-transitory computer-readable medium according to claim 1, wherein the instructions further cause the computer to adjust a difficulty level of the first game according to the game content that is given as the reward and usable in the second game.

7. The non-transitory computer-readable medium according to claim 1, wherein the instructions further cause the computer to move, when a predetermined operation is performed by the user, the one or more pieces to approach achievement of the purpose of the first game.

8. The non-transitory computer-readable medium according to claim 1, wherein the instructions further cause the computer to display a reference to achieve the purpose of the first game.

9. A method of controlling an information processing apparatus, the method comprising:
providing a user with a first game;
displaying one or more pieces, each of the one or more pieces being movable in vertical and horizontal directions, each of the one or more pieces being moved in a direction corresponding to a touch operation to the piece by the user; and retrieving, when a purpose of the first game is achieved, a game content as a reward given to the user, the game content being usable in a second game different from the first game to progress the second game.

10. The method according to claim 9, wherein the retrieved game content changes information that is set to a predetermined game content in the second game.

11. The method according to claim 9, wherein the retrieved game content is usable only in the second game.

12. The method according to claim 9, wherein the first game is a puzzle game.

13. The method according to claim 9, wherein the retrieved game content increases a speed of a predetermined game content in the second game.

14. The method according to claim 9, further comprising adjusting a difficulty level of the first game according to the game content that is given as the reward and usable in the second game.

15. An information processing apparatus comprising:
circuitry configured to:
provide a user with a first game, display one or more pieces, each of the one or more pieces being movable in vertical and horizontal directions, each of the one or more pieces being moved in a direction corresponding to a touch operation to the piece by the user; and
retrieve, when a purpose of the first game is achieved, a game content as a reward given to the user, the game content being usable in a second game different from the first game to progress the second game.

16. The information processing apparatus according to claim 15, wherein the retrieved game content changes information that is set to a predetermined game content in the second game.

17. The information processing apparatus according to claim 15, wherein the retrieved game content is usable only in the second game.

18. The information processing apparatus according to claim 15, wherein the first game is a puzzle game.

19. The information processing apparatus according to claim 15, wherein the retrieved game content increases a speed of a predetermined game content in the second game.

20. The information processing apparatus according to claim 15, wherein the circuitry is further configured to adjust a difficulty level of the first game according to the game content that is given as the reward and usable in the second game.

21. The non-transitory computer-readable medium according to claim 1, wherein the touch operation to the piece includes dragging the piece in vertical and horizontal directions, including up, down, left, and right, during the user touches the piece.

22. The method according to claim 9, wherein the touch operation to the piece includes dragging the piece in vertical and horizontal directions, including up, down, left, and right, during the user touches the piece.

23. The information processing apparatus according to claim 15, wherein the touch operation to the piece includes dragging the piece in vertical and horizontal directions, including up, down, left, and right, during the user touches the piece.

* * * * *